Dec. 11, 1928.
J. W. ANDERSON
INDICATOR
Filed May 24, 1926
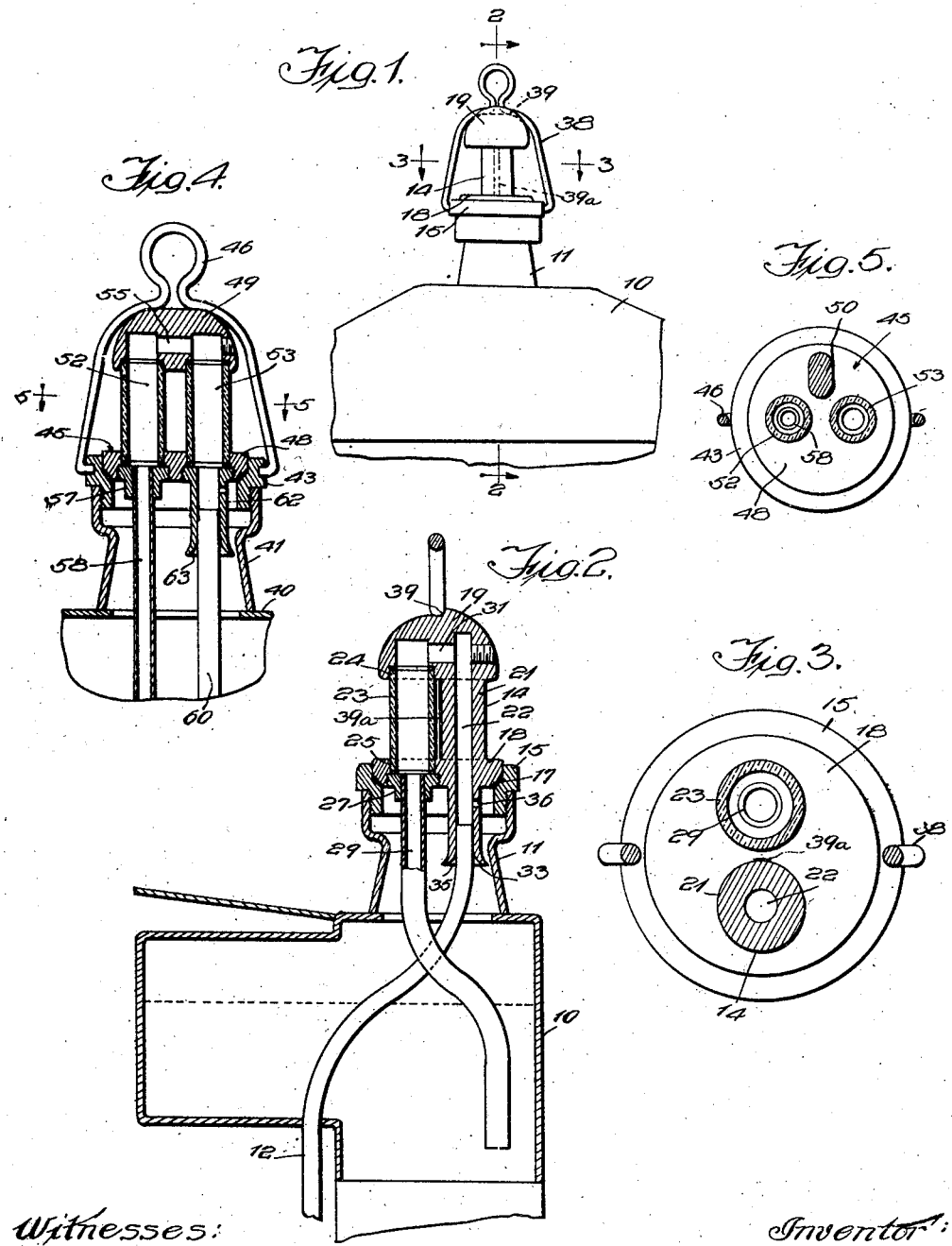

Dec. 11, 1928.
J. W. ANDERSON
INDICATOR
Filed May 24, 1926
1,694,902
2 Sheets-Sheet 2
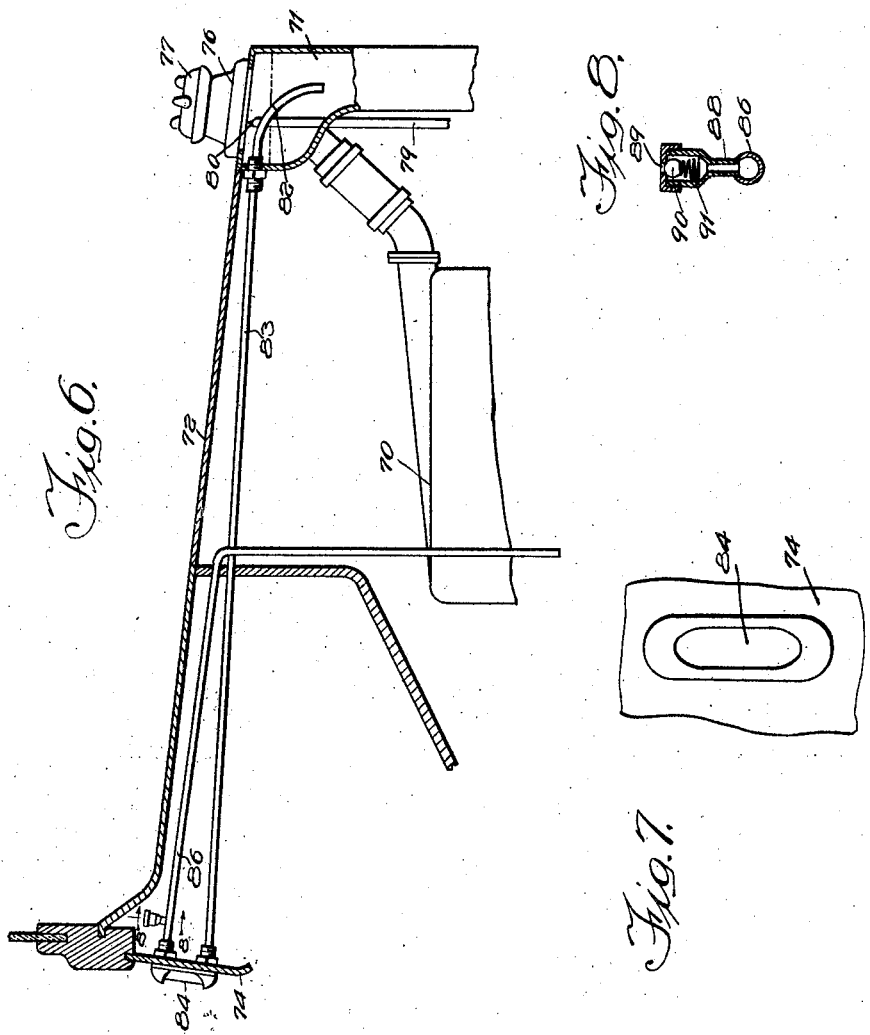

Patented Dec. 11, 1928.

1,694,902

UNITED STATES PATENT OFFICE.

JOHN W. ANDERSON, OF GARY, INDIANA.

INDICATOR.

Application filed May 24, 1926. Serial No. 111,345.

My invention relates broadly to means for indicating the conditions obtaining in a receptacle which contains liquid subjected to heat.

A particular object of the invention is to provide an improved device of the kind described adapted to use fluid obtained from the receptacle for indicating the conditions obtaining therein.

Another particular object of the invention is to provide in connection with the cooling system of an internal combustion engine a device which will produce a signal warning in advance of imminent wastage of cooling liquid because of overheating, another and different signal warning when such wastage is in progress, and still another and different signal warning when such or other wastage has reduced the supply of cooling liquid to a predetermined level in its container, and a different signal when no wastage of cooling liquid through overheating is imminent or in process.

The advantages of this invention over other devices which merely indicate the temperature at some predetermined point inside the cooling system of an internal combustion engine are obvious. Once calibrated, such other devices vary in their indications directly and solely in accordance with actual variations in temperature. Such other devices, therefore, must be inaccurate and unreliable as indicators of the boiling point or of the point at which wastage of cooling fluid occurs, because the boiling point varies decidedly with variations in altitude and with variations in the volatility of the cooling fluid caused by the addition or substitution of anti-freeze elements or solutions.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is an elevation of an indicating device embodying the invention, the improved device being shown in connection with an automobile radiator;

Fig. 2 is an enlarged section taken on line 2—2 of Fig. 1;

Fig. 3 is an enlarged section taken on line 3—3 of Fig. 1;

Fig. 4 is a vertical sectional view of an indicating device, embodying another form of the invention;

Fig. 5 is a section taken on line 5—5 of Fig. 4;

Fig. 6 is a fragmentary longitudinal section taken through an automobile to which apparatus embodying still another form of the invention has been applied;

Fig. 7 is a fragmentary front elevation of the portion of the dash of the automobile and shows a part of the improved apparatus; and Fig. 8 is an enlarged section taken on line 8—8 of Fig. 7.

Referring for the present to Figs. 1 to 3, inclusive, wherein I have shown a preferred form of the invention embodied in a device for indicating conditions obtaining in the cooling systems of an internal combustion engine, the reference character 10 designates generally a radiator of the type commonly employed in automobiles. The radiator 10 is provided with a filling opening or spout 11 and with the usual over-flow tube 12 which projects up into the filling spout 11.

The improved device embodying my invention serves as a closure member for the filling spout 11, and in this instance comprises a housing member 14 seated in a ring 15 which is screw-threaded into the upper end of the filling spout 11, packing 17 being preferably provided between the housing member 14 and the ring 15 to prevent waste of cooling fluid therebetween. As shown, the housing member 14 preferably comprises a base portion 18 seated in the ring 15 and a head portion 19 formed integral with the base portion and connected thereto by a tubular post 21 having a passage 22 extending therethrough. Mounted in the housing member 14 is a glass tube 23 or the equivalent which has its upper end seated in a recess 24 formed in the head portion 19, the lower end of the glass tube 23 being seated in a bore 25 formed in the base portion 18. Screw-threaded into the base portion 18 and aligned with the bore 25 is a bushing 27 from which a tube 29 depends. As indicated in Fig. 2, the tube 29 preferably extends to or below the minimum normal water level in the radiator 10, the construction being such that the interior of the radiator communicates with the glass tube 23 through the tube 29. The upper end of the glass tube 23 communicates with the passage 22 through a passage 31 formed in the head portion 19.

It will be noted that the passage 22 extends through a downwardly extending boss 33 provided upon the housing member 14 and is adapted to receive the upper end of the overflow tube 12. To facilitate the task of bringing the housing member 14 into the position wherein its passage 22 will receive the upper end of the over-flow tube 12, I preferably flare or taper the lower end of the passage 22 as indicated at 35. A comparatively small port 36 provided in the boss 33 communicates with the passage 22 and prevents liquid within the radiator 10 from siphoning through the housing member 14.

Any suitable means may be provided for securing the housing member 14 to the ring 15. Thus, I have shown a bail 38 pivoted to the ring 15 and adapted to be brought into the position wherein it is shown in Figs. 1 and 2 to engage the upper surface of the head portion 19, the head portion 19 being preferably provided with a shoulder 39 for limiting the movement of the bail in one direction. When the radiator 10 is to be filled, the bail 38 may be angularly displaced in a counterclockwise direction (Fig. 2) so that the housing member 14 together with the tube 29 may be removed from the filling spout 11. Then after the radiator 10 has been filled with cooling liquid, the housing member 14 and its depending tube 29 may be again positioned in the filling spout 11 and secured in place by the bail 38.

To facilitate the reading of the instrument, I may prefer to paint or otherwise form a narrow stripe 39ª, or the equivalent, upon the post 21 in some instances, which stripe will be magnified in width to the driver of the automobile when liquid enters the glass tube. The driver will then receive an exceedingly distinctive warning signal when a solid column of liquid rises in the glass tube.

It is, of course, understood that the cooling system for the internal combustion engine of an automobile will operate satisfactorily with different quantities of cooling liquid therein but that there is a minimum amount of cooling liquid required under substantially all ordinary operating conditions if the machine is to operate satisfactorily. The level the liquid then assumes in the radiator is herein termed the "minimum normal level," the level that the liquid assumes when the radiator has been filled recently and is in operation being termed the "maximum normal level".

The operation of the above described indicating device is substantially as follows: Assuming that the automobile upon which it is mounted is in operation and that it is operating in such manner that the temperature of the cooling fluid does not approach the boiling point thereof, there will be substantially no active indication of any kind in the glass tube 23. However, if for any reason the temperature of the cooling fluid approaches its boiling point, this fact will be indicated in the glass tube 23 by a solid column of water, the height of which fluctuates because of the lack of balance between the pressure within the radiator and the weight of the column of water extending through the tube 29 above the water level in the radiator. It is, of course, assumed that the tube 29 projects below the water level in the radiator at this time. The column of water extending into the glass tube 23 rises and falls irregularly and at times may disappear from the glass until the cooling fluid boils with sufficient violence to create a relatively high pressure within the radiator. Then a steady flow of liquid through the glass tube will be observed, this liquid being discharged from the cooling system by way of the overflow tube 12, there being practically no relief for the pressure within the radiator except through the tube 29, the glass tube 23 and thence through the over-flow tube 12 which communicates directly with the atmosphere. The cooling liquid in automobile radiators is almost invariably heavily discolored by rust and other impurities so that its visibility is high. Or it may be discolored deliberately by the addition of a suitable dye. If the driver of the automobile heeds the warning and slows down or stops the engine, or corrects any other condition which may be causing the abnormal condition within the radiator, the boiling ceases and the pressure within the radiator falls. The cooling fluid then ceases to waste through the over-flow tube 12 and the liquid disappears from the glass tube 23, the liquid going down in an unbroken column. It may be mentioned that as long as the tube 29 extends below the liquid left in the radiator and the cooling fluid is being wasted through the over-flow tube 12, the water glass shows plainly a steady flow of the cooling fluid without bubbles or irregularities of any kind.

If the driver does not heed this warning and the operation of the engine is continued without modification, the cooling liquid wastes through the over-flow tube 12 until the liquid left in the radiator falls below the lower end of the tube 29. Then steam or a mixture of steam and liquid wastes through the tube 29, the glass tube 23 and the overflow tube 12, the violently churning liquid and steam being readily observable in the glass tube 23 instead of the aforementioned unbroken column of liquid. This churning continues as long as there is any cooling liquid left in the radiator or until the boiling and steaming ceases.

For all practical purposes of manipulation and control by the driver, from the beginning of the operation of a "cold" automobile engine with cooling system in proper order and condition, for instance, the temperature of the cooling fluid passes, before actual damage to the engine from overheating may occur, progressively through four definite and significant stages, as follows:

The first stage: from atmospheric temperature to normal operating temperature. During this stage the cooling liquid does not approach the boiling point and does not waste, and therefore, the glass tube 23 remains clear. This clearly signifies that the operating conditions are normal in so far as any special attention of the operator is required. If there is sufficient cooling liquid in the radiator, this signal will continue as long as the operating conditions of the engine are normal.

The second stage: from normal operating temperature to simmering temperature which precedes active boiling. An unbroken column of liquid will then appear in the glass tube 23, the height of the column fluctuating in the manner described above.

The third stage: from simmering temperature creating comparatively slight pressure, to active boiling which causes wastage of cooling liquid because of the comparatively high steam pressure. The glass tube 23 then becomes completely filled with an unbroken column of liquid flowing therethrough and wasting through the over-flow tube 12.

The fourth stage: from active boiling and wasting of a still adequate reserve supply of cooling liquid to a comparatively superheated steaming and wasting of a dangerously depleted supply of cooling liquid. After sufficient cooling liquid has wasted through the over-flow tube 12 to bring the liquid level within the radiator below the lower end of the tube 29, the glass tube 23 shows violently churning steam and water passing therethrough. This signal is readily distinguished from the other three described and indicates that the cause of over-heating has not been corrected. This fourth signal will be given independently of any other signal whenever over-heating occurs with the level of the cooling liquid below the bottom end of the tube 29. For instance, if due to a leak in the radiator, a supply of cooling liquid adequate at the beginning of a trip is reduced gradually while conditions otherwise remain normal and no boiling occurs, sometime after the level of that supply falls below the bottom end of the tube 29, boiling of the cooling liquid will occur and the fourth warning signal will be given to the operator.

Since exhaustion of its reserve supply of cooling liquid must precede any actual damage to the engine from over-heating, separate, easily differentiated and highly visible signals or indications related definitely to the above described stages and reflecting those stages truly regardless of any variation in boiling point from any cause, are obviously more useful than the mere indication of temperature which may have no fixed relation to the point of actual boiling and wasting of cooling fluid.

As set forth above, the tube 29 preferably extends to or slightly below the minimum normal level but in some instances a driver may prefer to cut off a portion of the lower end of the tube 29 so as to receive an earlier signal that continued abnormal operation of the engine will result not only in the loss of whatever is left of the reserve supply of cooling fluid but of additional cooling liquid which will reduce the total thereof below the required minimum for normal operation of the automobile. However, I find it best to have the tube 29 project an appreciable distance below the maximum normal level.

Referring now to Figs. 4 and 5, wherein I have shown another form of the invention embodied in an indicating device which may be used in place of indicating device shown in Figs. 1 to 3, inclusive, the reference character 40 indicates a radiator having a filling opening or spout 41; a ring 43 substantially identical to the aforementioned ring 15 being screw-threaded into the upper end of the filling spout 41. Seated in the ring 43 is a housing member 45 which is detachably secured to the ring by a bail 46 pivoted to the ring, the bail 46 being substantially identical in construction with the aforementioned bail 38. The housing member 45 preferably comprises a base portion 48 formed integral with a head portion 49, the base and head portions being connected to each other by a post 50, or the equivalent. Mounted in the housing member 45 are glass tubes 52 and 53 which communicate with each other through a passage 55 formed in the head portion 49. Screw-threaded into the base portion 48 and aligned with the glass tube 52 is a bushing 57 carrying a tube 58 which communicates with the glass tube 52 and has its lower end preferably extending into the radiator 40 to or below the minimum normal liquid level therein. The radiator 40 is provided with the usual over-flow tube 60 engageable by a tubular member 62 which has its lower end flared or tapered as at 63 to permit quick alignment thereof with the upper end of the over-flow tube. The tubular member 62 is preferably screw-threaded into the base portion 48 and communicates with the glass tube 53.

While the indicating device shown in Figs. 1 to 3, inclusive, is preferably positioned upon the radiator in such manner that the tube 23 is disposed between the driver and the tubular post 21, the indicating device shown in Figs. 4 and 5 is preferably mounted upon the radiator in such manner that the driver may observe both of the tubes 52 and 53 at the same time. The indicating device shown in Figs. 4 and 5 operates in substantially the same manner as the indicating device shown in Figs. 1 to 3, inclusive, but in this instance the driver may observe the flow of liquid or a mixture of liquid and steam through two glass tubes instead of through a single glass tube.

In Figs. 6 to 8, inclusive, I have shown still another form of the invention embodied in apparatus adapted to be used in connection with the cooling system of an internal combustion engine. In this instance I have shown the improved apparatus applied to an automobile which comprises an internal combustion engine 70, a radiator 71, a hood 72 and an instrument board 74 which is in relatively close proximity to the driver's seat (not shown). The radiator 71 is operatively connected to the water jacket of the engine 70 and is preferably provided with a filling opening or spout 76 closed by the usual radiator cap 77. The usual over-flow tube is indicated at 79 but this may be omitted or the tube may be made substantially functionally inoperative in any suitable manner. Thus, I have shown its upper end almost entirely closed as at 80 to leave a small vent through which water above the over-flow tube may slowly escape. This prevents a false indication in the indicating apparatus as might otherwise occur when the cooling liquid approached its normal operating temperature. Projecting into the radiator 71 and preferably extending to or below the minimum normal liquid level therein is a curved tube 82 which communicates through a tube 83 with a glass tube 84 mounted upon the instrument board 74. It will be noted that the tube 83 communicates with the lower end of the glass tube 84 and that the upper end of the glass tube 84 communicates with a pipe or tube 86 which functions as an over-flow tube, as that end of the tube 86 not connected with the glass tube 84 preferably communicates directly with the atmosphere. To prevent siphoning through the glass tube 84, I preferably provide a lateral tubular extension 88 on the tube 86, the extension being provided with a port 89 through which air may enter the tube 86. The port 89 is normally closed by a ball valve 90 held seated by a spring 91, the arrangement being such that when the cooling liquid commences to siphon through the glass tube, atmospheric pressure will unseat the ball valve against the action of the spring 91 and air will enter the tube 86. This checks the siphoning action.

The apparatus shown in Figs. 6 and 7 functions substantially in the same manner as the apparatus shown in Figs. 1 to 3, inclusive, the glass tube 84 remaining clear as long as the internal combustion engine 70 is operating under normal conditions and the temperature of the cooling liquid does not become excessive. However, if there is a sufficient supply of cooling liquid and for some reason the temperature thereof rises until it begins to boil violently, the rise in pressure within the radiator will cause an unbroken column of liquid to advance through the tubes 82 and 83 into the glass tube 84 where it will fluctuate and warn the driver that a wastage of cooling fluid is about to occur. If the abnormal conditions under which the engine is operating are not corrected, or the engine is not slowed down or stopped, the pressure within the radiator will continue to rise and there will be a wastage of cooling fluid through the glass tube 84 and the over-flow tube 86, the liquid passing in a solid column through the glass tube until the level of the liquid in the radiator falls below the lower end of the curved tube 82. Then, if the engine 70 continues to operate under the abnormal conditions, a mixture of steam and water will pass through the glass tube 84 and waste through the overflow tube 86, the violently churning steam and water being observed in the glass tube 84. This will continue as long as abnormal operating conditions of the engine continue and cooling liquid remains in the cooling system.

Another important advantage of my improved apparatus is that wasting of the cooling fluid is normally retarded and delayed because sufficient pressure must first be developed within the radiator to raise an unbroken column of the liquid to a greater distance above the level of the liquid within the radiator. This, of course, prevents the liquid from wasting as quickly as it does in the usual construction wherein the receiving end of the overflow pipe is positioned lower and in the filling opening. It will be noted that it is the usual practice to have the overflow pipe extend as high as is possible into the filling opening.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A method of indicating thermal conditions in an automobile radiator having an overflow tube therein, which method comprises utilizing the pressure caused by a rise in temperature of the liquid in the radiator to raise a column of fluid above the radiator so that it may be observed by the driver of the automobile, and discharging said fluid through said overflow tube.

2. The combination with an automobile radiator having an overflow tube therein and having a filling opening aligned with the upper end of the overflow tube, of a device for indicating wastage of the cooling liquid in said radiator, said device comprising a hollow member including a sight glass positioned at said filling opening, said hollow member communicating with the interior of the radiator through said filling opening to permit the passage of fluid and liquid from said radiator into said hollow member, and tubular means removable with said hollow member from said radiator as a unit and connecting the interior of said hollow member with said overflow tube to discharge the contents of the hollow member into the overflow tube.

3. A device for indicating the wastage and imminent wastage of cooling liquid from an automobile radiator provided with an overflow tube and a filling opening aligned with the upper end of the overflow tube, said device comprising a hollow member including a sight glass positioned at the filling opening, said hollow member communicating with the interior of the radiator so that fluid or liquid may flow from said radiator into said hollow member, and tubular means removable with said hollow member from said radiator as a unit and connecting the interior of said hollow member with the upper end of said overflow tube, said tubular member being adapted to discharge the contents of said hollow member into said overflow tube.

4. Apparatus for observing fluid leaving or about to leave the radiator of the cooling system of an internal combustion engine, which radiator has an overflow pipe therein, said apparatus comprising a substantially transparent hollow member positioned above said radiator and communicating therewith so that fluid may flow from said radiator into said hollow member, and tubular means removable with said hollow member from said radiator as a unit and communicating with the interior of said hollow member adjacent the upper portion thereof and with the overflow pipe for discharging the contents of said hollow member into the atmosphere.

5. The combination with an automobile radiator having an overflow pipe therein and provided with a filling opening in its top wall, of means movably mounted on the radiator in the filling opening for indicating the operating conditions obtaining therein, said means comprising a housing member, a transparent hollow member mounted in said housing member, a tube extending from the housing member and communicating with the transparent hollow member, said tube being of sufficient length to extend below the top wall of the radiator at said filling opening, and a passage in said housing member communicating with the upper portion of the transparent hollow member and communicating with the intake end of the overflow pipe.

6. Apparatus for detachably securing a signaling device at the filling opening of an automobile radiator, said apparatus comprising an annular member secured to the radiator at said filling opening and adapted to support said signaling device, and a bail pivoted to said annular member and adapted to secure said signaling device to said annular member, said bail being adapted to be angularly displaced into a position wherein it permits removal of said signaling device from said annular member.

7. A device for indicating the thermal condition of a cooling liquid for internal combustion engines, said device being adapted to be mounted upon an automobile radiator at its filling opening and being adapted to cooperate with an overflow tube positioned within the radiator, said device comprising a tubular leg extending into the liquid to a point below said filling opening, a sight device visible above the liquid and communicating with said tubular leg, and a tube extending from the upper portion of the sight device and projecting into the radiator to discharge into said overflow pipe whereby upon increasing of the temperature of the cooling liquid there will be indicated, first, the initial abnormal condition of the liquid at the sight device, second, a secondary condition at the sight device as the liquid increases in temperature, and a third condition at the sight device when the cooling liquid is substantially being exhausted.

8. A device for internal combustion engines for indicating the thermal conditions of cooling liquid in the cooling system therefor, said device comprising a member adapted to be positioned at the filling opening of an automobile radiator, a looped conduit having two legs passing through said member, the upper ends of said legs communicating with each other and one of said legs being provided with a sight device, one of said legs being of a length to project into the radiator to a point below the filling opening therein, and the other of said legs being adapted to communicate with an overflow pipe in the radiator, said sight device being arranged so that ascending liquid is visible to indicate successive stages in the thermal conditions existing in the cooling system, to-wit: normal, initial abnormal, loss of liquid and insufficient liquid.

9. The combination with an automobile radiator having an overflow tube therein and being provided with a filling opening, of a device whereby liquid and fluid passing from said radiator will indicate temperature changes in said radiator, said device comprising a housing having a sight glass therein and positioned at the filling opening, a passage extending from the lower end of the sight glass to a point below the normal liquid level in said radiator, and a conduit communicating with the upper end of said sight glass and with the upper end of said overflow tube.

10. A device of the kind described for use in connection with an automobile radiator provided with a filling opening and having an overflow pipe projecting into the filling opening, said device comprising a closure member for said filling opening, a transparent hollow member carried by said closure member and projecting thereabove, said closure member being provided with a passage through which fluid may pass from said radiator up into said hollow member, and tubular means communicating with the upper end of said hollow member and extending through said closure member to communicate with the upper end of said overflow pipe.

11. The combination with an automobile radiator having an overflow tube therein and being provided with a filling opening, of a device whereby liquid and fluid passing from said radiator will indicate temperature changes in said radiator, said device comprising a housing having a sight glass therein and positioned at the filling opening, a passage extending from the lower end of the sight glass to a point below the normal liquid level in said radiator, and a conduit communicating with the upper end of said sight glass and with the upper end of said overflow tube, said conduit terminating in a flared end so as to be readily joinable with said overflow tube.

12. A device of the kind described for use in connection with an automobile radiator provided with a filling opening and having an overflow pipe projecting into the filling opening, said device comprising a closure member for said filling opening, a transparent hollow member carried by said closure member and projecting thereabove, said closure member being provided with a passage through which fluid may pass from said radiator up into said hollow member, and tubular means communicating with the upper end of said hollow member and extending through said closure member to communicate with the upper end of said overflow tube, said tubular means terminating in a flared end so as to be readily joinable with said overflow pipe.

In testimony whereof, I have hereunto signed my name.

JOHN W. ANDERSON.